Dec. 21, 1954    R. A. TROY    2,697,447
CONTROL DEVICE
Filed May 16, 1950

INVENTOR.
RAYMOND A. TROY
BY Ernest A. Joersen
ATTORNEY

United States Patent Office 2,697,447
Patented Dec. 21, 1954

2,697,447

CONTROL DEVICE

Raymond A. Troy, Palisades Park, N. J., assignor to Specialties Development Corporation, Belleville, N. J., a corporation of New Jersey Application May 16, 1950, Serial No. 162,279

5 Claims. (Cl. 137—620)

The present invention relates to devices for controlling the flow of fluid medium under pressure, and, more particularly, relates to an improved control device of the type disclosed in United States Patent Number 2,412,613.

The device disclosed in the aforementioned patent is primarily adapted for controlling the operation of a pressure actuated valve by controlling a pilot valve for admitting medium to the pressure actuated main valve operating means. This device provides for unseating the pilot valve to permit the flow of pressure medium through a passage connecting a source of pressure medium and the actuated means to thereby energize the latter, and for permitting the pilot valve to reseat and for venting of the passage to thereby de-energize the pressure medium actuated means.

Accordingly, an object of the present invention is to provide a control device of the foregoing character which is extremely simple in construction and economical to manufacture.

Another object is to provide such a device which is constructed of a minimum number of parts which are readily manufactured and assembled.

A further object is to provide such a device wherein the vent is sealed off effectively when the device is in operating position and the vent is placed in communication with the atmosphere when the device is returned to its non-operating position.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a control device which generally comprises a body adapted for securement to a valve housing and having a bore therein for establishing communication between a passage in the valve housing and the atmosphere, a sealing member in the bore, an axially movable member in the bore adapted for unseating a valve member normally closing the passage and having a seat for engaging the sealing member to prevent communication between the passage and the atmosphere when the valve member is unseated, and means for effecting movement of the movable member.

A preferred embodiment of the invention has been chosen for purposes of illustration and description, and is shown in the accompanying drawing, forming a part of the specification, wherein.

Figure 1:
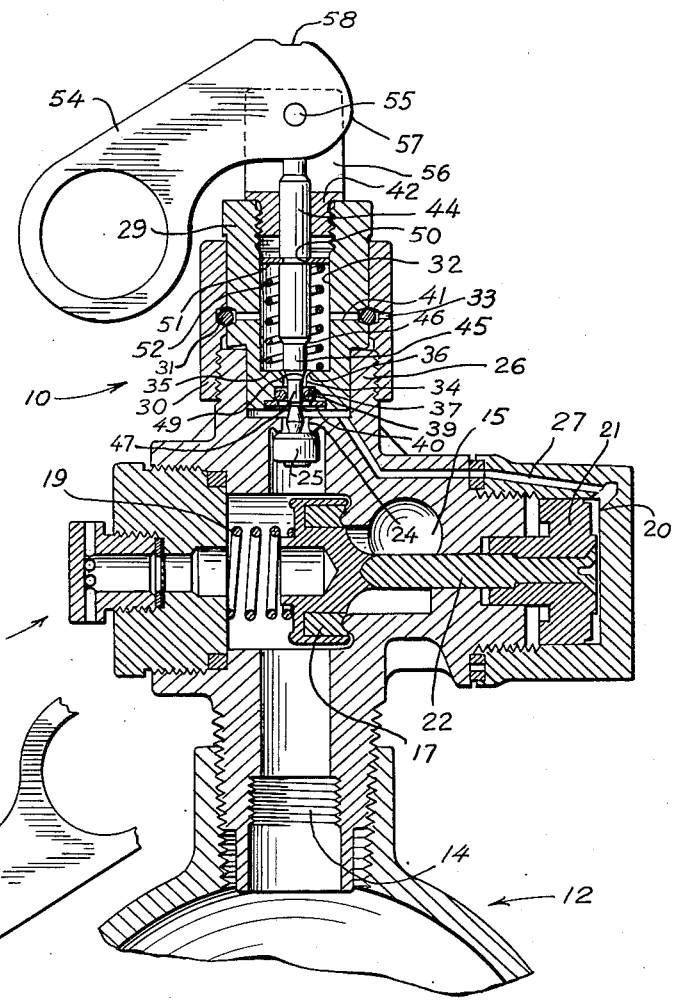
Figure 1 is a longitudinal sectional view of a control device in accordance with the invention, illustrating the device as used in connection with a pressure medium actuated valve.

Referring to the drawing in detail, there is shown a control device 10 as used with a pressure medium actuated valve 11 secured to a source of pressure medium such as a container 12.

The valve 11 generally comprises a housing having an inlet 14 in communication with the outlet of the container, an outlet 15 and a main valve seat 16 between the inlet and outlet; a main valve member 17; a spring 19 for normally urging the main valve on its seat; a cylinder 20; a piston 21 in the cylinder having a stem 22 for effecting unseating of the main valve; a pilot valve port 24 in communication with the inlet; a pilot valve member 25 for the port 24; a tubular exteriorly threaded sleeve 26 surrounding the port 24; and a conduit 27 extending from the interior of the sleeve 26 to the cylinder 20.

The control device 10 includes a body 29 formed with a reduced lower end portion which extends into and acts as a closure for the sleeve 26 whereby the interior of the sleeve and the conduit 27 constitutes a continuous passage between the pilot valve port 24 and the cylinder 20 through which the flow of pressure medium is controlled by the pilot valve member 25. The body 29 may be secured to the valve housing in any suitable manner, for example by an interiorly threaded coupling 30 connected with the sleeve 26, and loosely attached to the body for rotation thereabout by means of a ring 31 disposed in opposed annular grooves of the body and coupling. A conventional venting port 33 extends outwardly from the groove for the ring 31 through the coupling 30.

The body 29 is generally cup-shaped and has a central bore 32 therein provided with a reduced section 34 at the lower end which is in fluid flow communication with the passage leading to the cylinder 20. The reduction of the bore forms a shoulder or lower end wall 35, and an annular guide portion 36 is provided in this wall which surrounds the upper end of the bore section 34. The bore section 34 is provided with an annular recess 37 in which an annular sealing member such as an O-ring 39 is retained. The recess 37 may be formed by enlarging the lower end of the section 34 and securing a washer 40 over the lower end of the body which serves as a retainer for the ring 39. The body is further formed with vent passages 41 extending outwardly from the bore to the groove for receiving the ring 31.

An apertured plug 42 is threadedly secured into the upper end of the bore 32 which serves as a bearing for slidably mounting an axially movable plunger 44 in the bore. The upper end of the plunger extends upwardly through the plug and is engaged by means for effecting movement thereof as described hereinafter, and the lower end thereof is adapted to be moved outwardly of the body to effect unseating of the pilot valve member 25.

Figure 2:
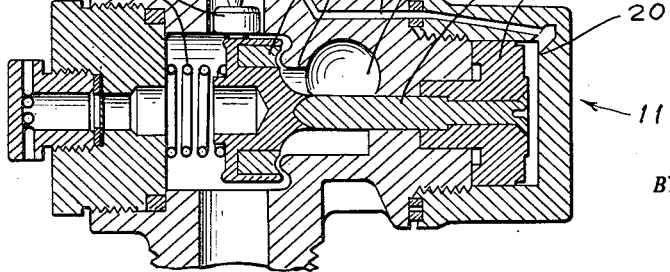
Figure 2 is a fragmentary sectional view similar to Figure 1 with the device shown in its operating position.

The plunger 44 comprises a reduced section 45 adjacent its lower end, a tapered portion 46 at the upper end of the section 45, a second reduced section 47 at the lower end of smaller diameter than the bore section 32 and the aperture of the O-ring 39, and a tapered portion 49 between the sections 45 and 47 for facilitating entry of the section 45 into the aperture of the ring to cause the ring to seal the bore when the plunger is positioned to unseat the pilot valve member, whereby the loss of pressure medium for actuating the piston 21 is prevented (Figure 2).

The plunger is further formed with an annular recess 50 adjacent the plug in which is positioned a ring 51. The plunger is normally urged upwardly by a spring 52 having its lower end seated on the wall 35 and having its upper end biased against the ring 51.

The plunger is adapted to be depressed by suitable mechanism, for example, a lever 54 pivotally mounted on a pin 55 extending through a pair of lugs 56 formed integral with the plug 42. The lever has a cam surface 57 for engaging the upper end of the plunger and moving the latter downwardly when the lever is raised upwardly as shown in Figure 2. The cam surface is so shaped at 58 that the lever is retained in its operating position but can be readily returned to its non-operating position.

The control device as described herein in this manner is adapted to be utilized to effect unseating of the pilot valve member 25 and sealing of the bore whereby fluid is conducted from the source to the cylinder 20 and the main valve member 17 is unseated. When it is desired to close the main valve port 16, the lever is returned to the position shown in Figure 1 whereby fluid in the passage between the pilot valve port 24 and the cylinder is vented to the atmosphere through the aperture of the O-ring and the clearances between the section 34 and the plunger sections 47 and 49, the bore 32, the passages 41, and between the loosely fitting body 29 and coupling 30. Thereupon the pilot valve member 25 closes the passage in which it is located and the spring 19 returns the main valve member to its seat.

From the foregoing description, it will be seen that the present invention provides a simple, practical and serviceable control device of the type indicated, which may be advantageously utilized for controlling the discharge of fluid pressure medium such as compressed or liquefied gas.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A control device for unseating a valve member normally closing a fluid medium passage in a valve housing, said device comprising a cup-shaped body separable from and adapted for securement to the valve housing, said body having an end wall formed with an opening adapted to be positioned adjacent the valve housing passage when said body is secured thereto, said body having an annular recess adjacent said opening and positioned axially outwardly thereof, said body having a bore extending from said end wall to the opposite end thereof, and said body having means establishing communication between said bore and the atmosphere; an apertured plug in the end of said bore opposite said end wall; a compressible O-ring in said recess; an axially movable plunger slidably positioned in the aperture of said plug and having an end extending outwardly of said plug, said plunger having its other end extending through the opening of said end wall for unseating the valve member and being formed with a shoulder section for engaging said O-ring to form a seal between the passage of the valve housing and the bore of said body; a flange on said plunger; a cylindrical helical spring in said bore through which said plunger extends having one end engaging said end wall and having the other end engaging said flange; and means mounted on said plug for effecting movement of said plunger in opposition to said spring.

2. A control device according to claim 1, wherein a washer is secured to the end of said body formed with said end wall for retaining said O-ring in said recess.

3. In a control device for unseating a valve member normally closing a fluid medium passage in a valve housing including a cup-shaped body adapted for securement to the valve housing having a bore therein provided with a reduced section in communication with the passage and means in communication with the atmosphere, an apertured plug in the end of said bore opposite its reduced section, a sealing member in said reduced section, an axially movable plunger having an end extending through said reduced bore section for unseating the valve member, a seat for engaging said sealing member and an end extending outwardly through the aperture of said plug; a lever pivotally mounted on said plug having a cam for engaging the outwardly extending end of said plunger and moving the same in a direction to unseat the valve member, and a spring in said bore constructed and arranged to normally urge said plunger in a direction toward said cam, said cam having a recess positioned for receiving said outwardly extending end of said plunger when said lever is in an operated position to cause said plunger to unseat the valve member, whereby said plunger is effective to retain said lever in its operated position under the influence of said spring.

4. A control device according to claim 3, wherein said plug has a pair of lugs thereon and said lever is pivotally mounted on a pin extending through said lugs.

5. In a control device for unseating a valve member normally closing a fluid medium passage in a valve housing including a cup-shaped body adapted for securement to the valve housing having a bore therein provided with a reduced section in communication with the passage and means in communication with the atmosphere, an apertured plug in the end of said bore opposite its reduced section, a sealing member in said reduced section, a pair of lugs on said plug extending away from said bore and a lever pivotally mounted on a pin extending through said lugs having a cam surface provided with a recess; an axially movable plunger having an end extending through said reduced bore section for unseating said valve member, a seat for engaging said sealing member and an end extending outwardly through said aperture in said plug, said outwardly extending end being adapted for engagement with said cam surface and said recess, whereby operation of said lever is effective to unseat said valve member and said plunger is effective to retain said lever in its operated position, and a spring in said bore constructed and arranged to normally urge said plunger in an opposite direction.

References Cited in the file of this patent

UNITED STATES PATENTS

| Number | Name | Date |
|---|---|---|
| 1,532,029 | Bobbitt | Mar. 31, 1925 |
| 1,567,711 | Chase | Dec. 29, 1925 |
| 1,684,033 | Josephs | Sept. 11, 1928 |
| 2,194,413 | Della Chiesa et al. | Dec. 26, 1939 |
| 2,336,132 | Siegel | Dec. 7, 1943 |
| 2,412,613 | Grant | Dec. 17, 1946 |
| 2,485,504 | Morgan | Oct. 18, 1949 |
| 2,515,029 | Almond et al. | July 11, 1950 |